(12) United States Patent
Mehmi et al.

(10) Patent No.: US 9,701,548 B2
(45) Date of Patent: *Jul. 11, 2017

(54) ELECTROCHEMICAL WATER SOFTENING SYSTEM

(71) Applicant: HydroNovation, Inc., La Palma, CA (US)

(72) Inventors: Ramandeep Mehmi, Tracy, CA (US); Anil Jha, San Francisco, CA (US); Peter Naylor, San Francisco, CA (US); Benjamin Rush, Oakland, CA (US)

(73) Assignee: HydroNovation, Inc., La Palma, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/429,727

(22) Filed: Feb. 10, 2017

(65) Prior Publication Data

US 2017/0152161 A1    Jun. 1, 2017

Related U.S. Application Data

(63) Continuation of application No. 14/772,269, filed as application No. PCT/US2014/024220 on Mar. 12, 2014, now Pat. No. 9,574,277.

(60) Provisional application No. 61/798,756, filed on Mar. 15, 2013.

(51) Int. Cl.
| | |
|---|---|
| *B01D 61/44* | (2006.01) |
| *C02F 1/46* | (2006.01) |
| *C02F 1/469* | (2006.01) |
| *C25B 1/46* | (2006.01) |

(52) U.S. Cl.
CPC .......... *C02F 1/4602* (2013.01); *C02F 1/4691* (2013.01); *C02F 1/4695* (2013.01); *C25B 1/46* (2013.01); *C02F 2201/46115* (2013.01); *C02F 2209/06* (2013.01)

(58) Field of Classification Search
CPC ......... B01D 61/44; B01D 61/48; C02F 1/469; C02F 1/4602; C02F 1/4695; C02F 1/4693; C02F 1/4691; C02F 2209/001; C02F 2209/06; C02F 2209/05; C02F 2201/46115; C02F 2103/06; C25B 1/46
See application file for complete search history.

(56) References Cited

U.S. PATENT DOCUMENTS 9,574,277 B2 * 2/2017 Jha ............................ C25B 1/46

FOREIGN PATENT DOCUMENTS

CN           1240196 A      1/2000

* cited by examiner

*Primary Examiner* — Arun S Phasge
(74) *Attorney, Agent, or Firm* — Lando & Anastasi, LLP

(57) ABSTRACT

Systems and methods for treating water are provided. The systems and methods may utilize an electrochemical water treatment device comprising ion exchange membranes. In certain systems and methods, a concentrate stream and a dilution stream may be in fluid communication with ion exchange membranes. The ion exchange membranes may be configured to provide a ratio of a pH of the concentrate stream and a pH of the dilution stream to be less than about 1.0. In some instances, the LSI of the concentrate stream may be less than or about 1.0. In certain instances, the electrochemical water treatment device does not require a reverse polarity cycle.

16 Claims, 4 Drawing Sheets

ELECTROCHEMICAL WATER SOFTENING SYSTEM

CROSS-REFERENCE TO RELATED APPLICATIONS

This application is a continuation of and claims the benefit under 35 U.S.C. §120 of co-pending U.S. patent application Ser. No. 14/772,269 titled ELECTROCHEMICAL WATER SOFTENING SYSTEM filed on Sep. 2, 2015, which is a U.S. National Phase Application under 35 U.S.C. §371 of International Application No. PCT/US2014/024220, filed Mar. 12, 2014, titled ELECTROCHEMICAL WATER SOFTENING SYSTEM, which claims priority under 35 U.S.C. §119(e) to U.S. Provisional Application No. 61/798,756, filed Mar. 15, 2013, titled ELECTROCHEMICAL WATER SOFTENING SYSTEM, each of which is incorporated by reference herein in its entirety for all purposes.

FIELD OF THE DISCLOSURE

Aspects generally relate to a system and method for treating water from a point of entry by contacting a source of feed water with at least one ion exchange membrane housed in an electrochemical water treatment device to produce water suitable for residential or commercial applications.

SUMMARY

In accordance with one or more embodiments, a water treatment system for a residential or commercial application is provided. The water treatment system comprises an electrochemical water treatment device comprising at least one ion exchange membrane, a concentrate stream in fluid communication with the at least one ion exchange membrane, and a dilution stream in fluid communication with the at least one ion exchange membrane, wherein the at least one ion exchange membrane is configured to provide a ratio of a pH of the concentrate stream and a pH of the dilution stream to be less than about 1.0. According to at least one embodiment, the ratio of the pH of the concentrate stream and the pH of the dilution stream is about 0.9. In some embodiments, the pH of the concentrate stream is less than or about 7.0. In certain aspects, an LSI of the concentrate stream is less than or about 1.0. In a further aspect, the LSI of the concentrate stream is less than or about 0.5. In at least one aspect, a conductivity, an alkalinity, and a pH of the dilution stream are about 300 µS/cm, about 100 ppm, and greater than about 7.0, respectively. In a further aspect, an LSI of the concentrate stream is about 0.2. In another aspect, the system does not require a separate source of acidic water for the concentrate stream. In some aspects, the system does not require a reverse polarity cycle. According to at least one embodiment, the at least one at least one ion exchange membrane is configured to require at least about 25% less time to reduce a hardness of a feed stream to a predetermined level than an electrochemical device that does not comprise the at least one ion exchange membrane.

In accordance with one or more embodiments, a method of treating water for a residential or commercial application is provided. The method comprises feeding water from a point of entry to an electrochemical water treatment device and passing the feed water through a concentrating compartment and a diluting compartment of the electrochemical water treatment device to produce a concentrate stream and a product stream. A ratio of a pH of the concentrate stream to a pH of the product stream is less than about 1.0. In at least one further aspect, the ratio of the pH of the concentrate stream to the pH of the product stream is about 0.9. According to some embodiments, the method further comprises recirculating the concentrate stream. In various embodiments, the pH of the recirculating concentrate stream is less than or about 7.0. In at least one embodiment, the method further comprises calculating an LSI of the concentrate stream. In various aspects, the LSI of the concentrates stream is less than or about 1.0. In various aspects, an LSI of the concentrate stream is less than about 1.0. In various further aspects, the LSI of the concentrate stream is less than or about 0.5. According to some embodiments, the method further comprises storing at least a portion of the product stream and measuring a conductivity, an alkalinity, and a pH of the stored portion of the product stream. In various embodiments, the conductivity, the alkalinity, and the pH of the stored portion of the product stream are about 300 µS/cm, about 100 ppm, and greater than about 7.0, respectively. In a further embodiment, the method further comprises calculating an LSI of the concentrate stream. In some embodiments, the LSI of the concentrate stream is about 0.2. In some aspects, the method does not require the addition of a separate source of acidic water to the concentrate stream. In certain aspects, the method does not require a reverse polarity cycle.

BRIEF DESCRIPTION OF THE DRAWINGS

Non-limiting embodiments of the systems and methods described herein will be described by way of example, and optionally, with reference to the accompanying drawings. In the following description, various embodiments of the systems and methods described herein are described with reference to the following drawings, in which.

DETAILED DESCRIPTION

Figure 1:
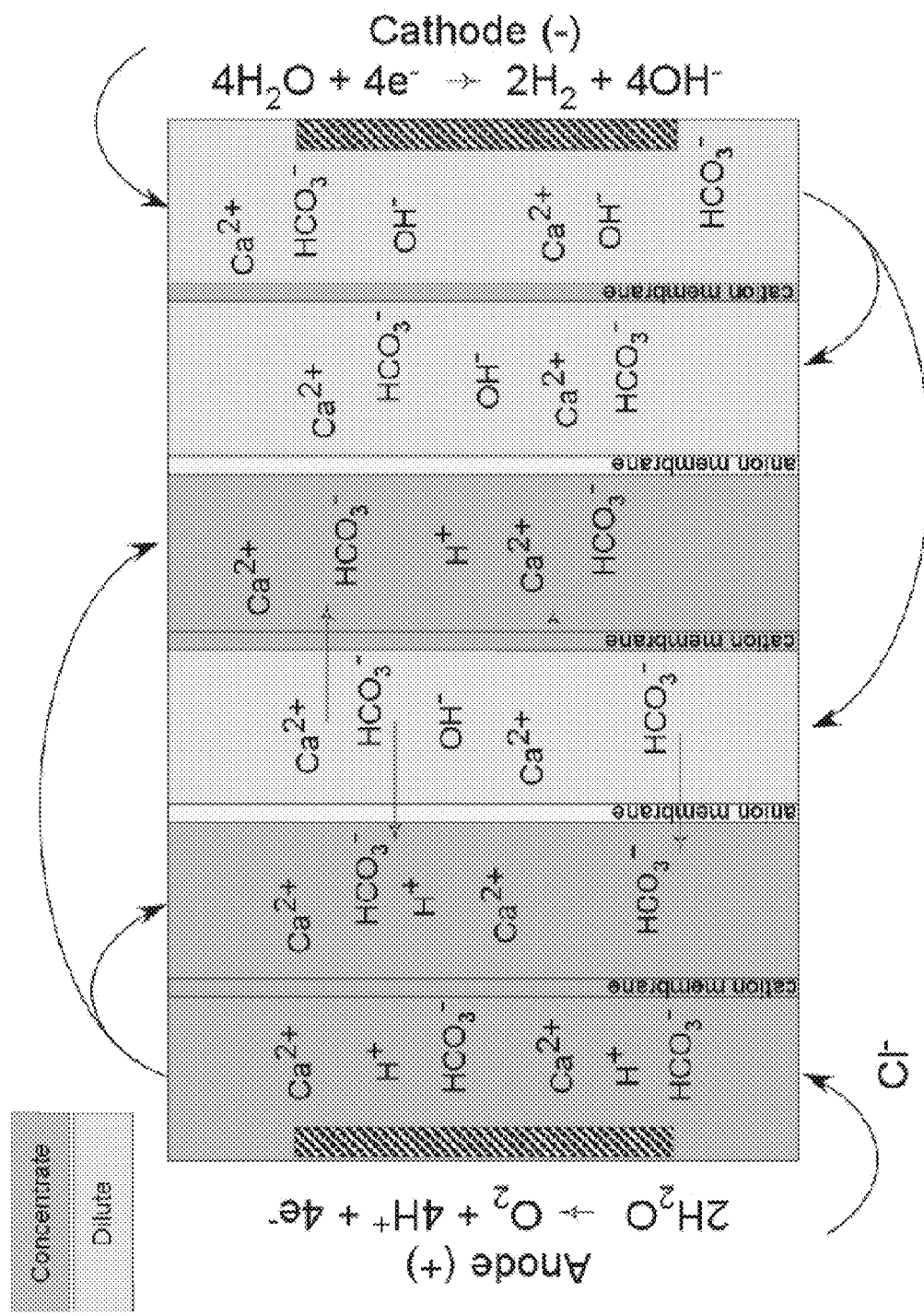
FIG. 1 is a schematic illustration of an electrochemical water treatment device in accordance with one or more embodiments.

Water that contains hardness species such as calcium and magnesium may be undesirable for some uses, for example, in industrial, commercial, residential, or household applications. Hard water requires more soap and synthetic detergents for home laundry and washing, and contributes to scaling in pipes, boilers and industrial equipment. Hardness is caused by compounds of calcium and magnesium, as well as a variety of other metals, and is primarily a function of the geology of the area where the ground water is located. Water acts as an excellent solvent and readily dissolves minerals it comes in contact with. As water moves through soil and rock, it dissolves very small amounts of minerals and holds them in solution. Calcium and magnesium dissolved in water are the two most common minerals that make water "hard," although iron, strontium, and manganese may also contribute. The hardness of water is referred to by three types of measurements: grains per gallon (gpg), milligrams per liter (mg/L), or parts per million (ppm). Hardness is usually reported as an equivalent quantity of calcium carbonate ($CaCO_3$). One grain of hardness equals 17.1 mg/L or 17.1 ppm of hardness. The typical guidelines for a classification of water hardness are: zero to 60 mg/L of calcium carbonate is classified as soft; 61 mg/L to 120 mg/L as moderately hard; 121 mg/L to 180 mg/L as hard; and more than 180 mg/L as very hard.

Alkalinity and hardness are both important components of water quality. Alkalinity is a measure of the amount of acid (hydrogen ion) water can absorb (buffer) before achieving a designated pH. Total alkalinity indicates the quantity of base present in water, for example, bicarbonates, carbonates, phosphates, and hydroxides. Hardness represents the overall concentration of divalent salts for example, calcium, magnesium, and iron, but does not identify which of these elements is/are the source of hardness.

Hard water contains greater than about 60 ppm of calcium carbonate and is often treated prior to use by being passed through a water softener. Typically, the water softener is of the rechargeable ion exchange type and is charged with cation resin in the sodium form and anion resin in the chloride form. As water passes through the resin bed, major contributors to hardness, such as calcium and magnesium species, are exchanged for sodium. In this manner, the water can be softened by a water softening system as the concentration of divalent cations and, in particular, calcium and magnesium ions decrease.

Ion exchange is the reversible interchange of ions between a solid (for example, an ion exchange resin) and a liquid (for example, water). Since ion exchange resins act as "chemical sponges," they are ideally suited for effective removal of contaminants from water and other liquids. Ion exchange technology is often used in water demineralization and softening, wastewater recycling, and other water treatment processes. Ion exchange resins are also used in a variety of specialized applications, for example, chemical processing, pharmaceuticals, mining, and food and beverage processing.

In water softening systems, the hardness ions become ionically bound to oppositely charged ionic species that are mixed on the surface of the ion exchange resin. The ion exchange resin eventually becomes saturated with ionically bound hardness ion species and must be regenerated. Regeneration involves replacing the bound hardness species with more soluble ionic species, such as sodium chloride. The hardness species bound on the ion exchange resin are replaced by the sodium ions and the ion exchange resins are ready again for a subsequent water-softening step. However, an equivalent of sodium is added to the treated water for every equivalent of calcium that is removed. Thus, although the water is softened, the hardness is replaced with sodium ions that some consumers may find undesirable. Furthermore, when these ion exchange beds are recharged, the resulting brine must be disposed of and is often discharged to a septic system where the brine becomes available to re-enter the ground water. In certain regions, discharge of brine to a domestic septic system or to the environment is regulated or prohibited.

Other methods of softening water include the use of reverse osmosis devices that can supply high purity water, but generally do so at a slow rate and require the use of a high pressure pump. Furthermore, many reverse osmosis membranes can be fouled by the presence of dissolved materials such as silica, which may often be found in well water.

Quality drinking water is often associated with highly purified water. However, as long as the water is free of microbial contamination, the best drinking water may not necessarily be the most chemically pure. For example, water that has been purified to a high resistivity, for example, greater than about 1 megaOhm, may be so devoid of ionic content that it becomes "hungry" and corrosive to material, such as copper, that may be used in water piping systems. Taste may also be affected by, for instance, the removal of bicarbonate species. Furthermore, beneficial or desirable chemicals that have been added to the water, for example, fluoride and chlorine species, may be removed along with undesirable species, resulting in water that may need to be re-fortified. In some regions, minimum levels of calcium may be necessary in order to comply with health and safety regulations and a high purity system that removes greater than, for example, 90% or 99% of the calcium from the water supply may be inappropriate.

Devices for purifying fluids using electrical fields are commonly used to treat water and other liquids containing dissolved ionic species. Within these devices are concentrating and diluting (or depletion) compartments separated by ion-selective membranes. An example of such a device is shown in FIG. 1, and includes an electrochemical water treatment apparatus featuring alternating electroactive semipermeable anion and cation exchange membranes. Spaces between the membranes are configured to create liquid flow compartments with inlets and outlets. An applied electric field imposed via electrodes causes dissolved ions, attracted to their respective counter-electrodes, to migrate through the anion and cation exchange membranes. This generally results in the liquid of the diluting compartment being depleted of ions, and the liquid in the concentrating compartment being enriched with the transferred ions.

As used herein, the phrases "treatment device" or "purification device" or "apparatus" pertain to any device that can be used to remove or reduce the concentration level of any undesirable species from a fluid to be treated. Examples of suitable treatment apparatuses include, but are not limited to, ion-exchange resin devices, reverse osmosis, electrodeionization, electrodialysis, ultrafiltration, microfiltration, and capacitive deionization devices.

In certain non-limiting embodiments, the methods and systems disclosed here comprise an electrochemical water treatment device. As used herein, the phrase "electrochemical water treatment device" refers to any number of electrochemical water treatment devices, non-limiting examples including, but not limited to, electrodeionization devices, electrodialysis devices, capacitive deionization devices, and any combination thereof. The electrochemical water treatment devices may include any device that functions in accordance with the principles of the systems and methods described herein as long as they are not inconsistent or contrary these operations.

In certain embodiments, the electrochemical treatment device may include electrochemical deionization units. Non-limiting examples of such devices include electrodialysis (ED), electrodialysis reversal (EDR), electrodeionization (EDI), capacitive deionization, continuous electrodeionization (CEDI), and reversible continuous electrodeionization (RCEDI).

Electrodeionization (EDI) is a process that removes, or at least reduces, one or more ionized or ionizable species from water using electrically active media and an electric potential to influence ion transport. The electrically active media typically serves to alternately collect and discharge ionic and/or ionizable species and, in some cases, to facilitate the transport of ions, which may be continuously, by ionic or electronic substitution mechanisms. EDI devices can comprise electrochemically active media of permanent or temporary charge, and may be operated batch-wise, intermittently, continuously, and/or even in reversing polarity modes. EDI devices may be operated to promote one or more electrochemical reactions specifically designed to achieve or enhance performance. Further, such electrochemical devices may comprise electrically active membranes, such as semi-permeable or selectively permeable ion exchange or bipolar membranes. Continuous electrodeionization (CEDI) devices are EDI devices known to those skilled in the art that operate in a manner in which water purification can proceed continuously, while ion exchange material is continuously recharged. CEDI techniques can include processes such as continuous deionization, filled cell electrodialysis, or electrodiaresis. Under controlled voltage and salinity conditions, in CEDI systems, water molecules can be split to generate hydrogen or hydronium ions or species and hydroxide or hydroxyl ions or species that can regenerate ion exchange media in the device and thus facilitate the release of the trapped species therefrom. In this manner, a water stream to be treated can be continuously purified without requiring chemical recharging of ion exchange resin.

Electrodialysis (ED) devices operate on a similar principle as CEDI, except that ED devices typically do not contain electroactive media between the membranes. Because of the lack of electroactive media, the operation of ED may be hindered by feed waters of low salinity because of elevated electrical resistance. Also, because the operation of ED on high salinity feed waters can result in elevated electrical current consumption, ED apparatuses have heretofore been most effectively used on source waters of intermediate salinity. In ED based systems, because there is no electroactive media, splitting water is inefficient and operating in such a regime is generally avoided.

A capacitive deionization (CapDI) device is used to remove an ionic material from a medium, for example, hard water, by applying a voltage to a pair of electrodes having nanometer-sized pores to polarize the pair of electrodes. This allows ionic material to be adsorbed onto a surface of at least one of the pair of electrodes. In the CapDI device, a low DC voltage is applied to the pair of electrodes and the medium containing dissolved ions then flows between the two electrodes. Anions dissolved in the medium are adsorbed and concentrated in the positive electrode, and cations dissolved in the medium are adsorbed and concentrated in the negative electrode. When a current is supplied in a reverse direction, for example, by electrically shorting the two electrodes, the concentrated ions are desorbed from the negative electrode and the positive electrode. Since the CapDI device does not use a high potential difference, the energy efficiency is high. The CapDI device may remove detrimental ions as well as hardness components, when ions are adsorbed onto the electrodes. The CapDI device does not use a chemical to regenerate the electrodes, and therefore the CapDI device has a relatively low environmental impact.

As shown in FIG. 1, CEDI and ED devices may include a plurality of adjacent cells or compartments that are separated by selectively permeable membranes that allow the passage of either positively or negatively charged species, but typically not both. Dilution or depletion compartments are typically interspaced with concentrating or concentration compartments in such devices. In some embodiments, a cell pair may refer to a pair of adjacent concentrating and diluting compartments. As water flows through the depletion compartments, ionic and other charged species are typically drawn into concentrating compartments under the influence of an electric field, such as a DC field. Positively charged species are drawn toward a cathode, typically located at one end of a stack of multiple depletion and concentration compartments, and negatively charged species are likewise drawn toward an anode of such devices, typically located at the opposite end of the stack of compartments. The electrodes are typically housed in electrolyte compartments that may be partially isolated from fluid communication with the depletion and/or concentration compartments. Once in a concentration compartment, charged species are typically trapped by a barrier of selectively permeable membrane that may be at least partially defining the concentration compartment. For example, anions may be prevented from migrating further toward the cathode, out of the concentration compartment, by a cation selective membrane. Once captured in the concentrating compartment, trapped charged species can be removed in a concentrate stream.

In CEDI and ED devices, the DC field is typically applied to the cells from a source of voltage and electric current applied to the electrodes (anode or positive electrode, and cathode or negative electrode). The voltage and current source (collectively "power supply") can be itself powered by a variety of means such as an AC power source, or for example, a power source derived from solar, wind, or wave power. At the electrode/liquid interfaces, electrochemical half cell reactions occur that initiate and/or facilitate the transfer of ions through the membranes and compartments. For example, in FIG. 1, when a voltage is applied across the cathode and anode, bicarbonate, calcium, hydroxide and hydrogen ions may form in the solution.

The specific electrochemical reactions that occur at the electrode/interfaces can be controlled to some extent by the concentration of salts in the specialized compartments that house the electrode assemblies. For example, a feed to the anode electrolyte compartments that is high in sodium chloride will tend to generate chlorine gas and hydrogen ion, while such a feed to the cathode electrolyte compartment will tend to generate hydrogen gas and hydroxide ion. Generally, the hydrogen ion generated at the anode compartment will associate with a free anion, such as chloride ion, to preserve charge neutrality and create hydrochloric acid solution, and analogously, the hydroxide ion generated at the cathode compartment will associate with a free cation, such as sodium, to preserve charge neutrality and create sodium hydroxide solution. The reaction products of the electrode compartments, such as generated chlorine gas and sodium hydroxide, can be utilized in the process as needed for disinfection purposes, for membrane cleaning and defouling purposes, and for pH adjustment purposes.

The performance of electrochemical water treatment devices, especially in hard water applications, may be limited by precipitation formed from hard ions such as calcium and magnesium. When water exceeds the solubility limit, hard ions, such as calcium and magnesium, drop out as crystals. One of the methods for determining the solubility limit is the Langelier Saturation Index (LSI). The Langelier Saturation Index (sometimes called the Langelier Stability Index) is a calculated number used to predict the calcium carbonate stability of water. LSI may be calculated according to a standard method, for example, ASTM D 3739. The resulting value indicates whether the water will precipitate, dissolve, or be in equilibrium with calcium carbonate.

The Langelier saturation level approaches the concept of saturation using pH as a main variable. The LSI is expressed as the difference between the actual system pH and the saturation pH. LSI can be interpreted as the pH change required to bring water to equilibrium. Water with an LSI of 1.0 is one pH unit above saturation. Reducing the pH by 1 unit will bring the water into equilibrium. This occurs because the portion of total alkalinity present as $CO_3^{-2}$ decreases as the pH decreases. For LSI>0, water is super saturated and tends to precipitate a scale layer of $CaCO_3$. For LSI=0 or close to 0, water is saturated (in equilibrium) with $CaCO_3$. A scale layer of $CaCO_3$ is neither precipitated nor dissolved. Water quality, changes in temperature, or evaporation could change the index. For LSI<0, water is under saturated and tends to dissolve solid $CaCO_3$.

If the actual pH of the water is below the saturation pH, the LSI is negative and the water has a very limited scaling potential. If the actual pH exceeds the saturation pH, then LSI is positive, and being supersaturated with $CaCO_3$, the water has a tendency to form scale. At increasing positive index values, the scaling potential increases.

LSI values are also dependent on temperature, with LSI becoming more positive as the water temperature increases. This may have particular implications in situations where well water is used. The temperature of the water when it first exits the well is often significantly lower than the temperature inside the building served by the well, or inside the laboratory or process unit where the LSI measurement is made. The resulting increase in temperature can cause scaling, especially in hot water heaters. Conversely, systems that reduce water temperature will have less scaling.

One of the potential problems in electrochemical water treatment processes is the risk of forming insoluble calcium or magnesium deposits. These deposits are formed at conditions of high $Ca^{2+}$ and/or $Mg^{2+}$ concentration and at high pH values. Thus, LSI increases in the concentrating compartments of electrochemical water treatment devices due to the increase in hard ion concentration, or where the water is removed without reduction of hard ion concentration. Most electrochemical water treatment devices are designed to maintain the LSI at values of about 0 to 2. In order to maintain these values, more water is required in the concentrating compartment, resulting in higher volumes of waste water. This contributes to inefficiencies in operating the electrochemical water treatment device.

Frequently, electrochemical water treatment devices are designed to remove as many ions as possible. For many industrial and commercial uses, this highly purified water may be beneficial; however, this level of purity may be undesirable for other applications, for example, a household water supply, where some level of cation content may be beneficial. Furthermore, highly purified water may be corrosive and may be prone to attack copper pipes that are often present in water distribution systems. Some water distribution systems may include lead soldered joints, and heavy metals, such as lead, may also leach into water passing through the pipes.

As used herein, "hardness" refers to a condition that results from the presence of polyvalent cations, for example calcium, magnesium, or other metals, in water, that adversely affect the cleansing capability of the water and the "feel" of the water, and may increase scaling potential. Hardness is usually quantified by measuring the concentration of calcium and magnesium species. In certain embodiments, undesirable species can include hardness ion species.

Electrical conductivity (EC) is a measure of water's ability to "carry" an electrical current, and, indirectly, a measure of dissolved solids or ions in the water. Deionized water has a very low conductivity value (nearly zero); hence, the more dissolved solids and ions occurring in the water, the more electrical current the water is able to conduct. A conductivity probe in conjunction with a temperature sensor is capable of determining the electrical resistance of a liquid. Fresh water usually reflects electrical conductivity in units of micro Siemens (μS/cm).

Total Dissolved Solids (TDS) are the total amount of mobile charged ions, including minerals, salts, or metals dissolved in a given volume of water, expressed in units of mg per unit volume of water (mg/L), also referred to as parts per million (ppm). TDS is directly related to the purity and quality of water and water purification systems and affects everything that consumes, lives in, or uses water, whether organic or inorganic. The term "dissolved solids" refers to any minerals, salts, metals, cations or anions dissolved in water, and includes anything present in water other than the pure water ($H_2O$) molecule and suspended solids. In general, the total dissolved solids concentration is the sum of the cations and anions in the water. Parts per million (ppm) is the weight-to-weight ratio of any ion to water. TDS is based on the electrical conductivity (EC) of water, with pure water having virtually no conductivity.

As used herein, the term "system yield" also refers to treatment system recovery, meaning the measure of waste versus production. System yield/recovery rates are determined using the following calculation:

$$\text{System yield} = [\text{Product volume}/(\text{Waste volume} + \text{Product volume})] * 100$$

The systems and methods described herein are directed to water treatment or purification systems and methods of providing treated water in industrial, commercial, residential, and household settings. One or more embodiments will be described using water as the fluid but should not be limited as such. For example, where reference is made to treating water, it is believed that other fluids can be treated according to the systems and methods described herein. Moreover, the treatment systems and apparatuses described herein are believed to be applicable in instances where reference is made to a component of the system or to a method that adjusts, modifies, measures or operates on the water or a property of the water. The fluid to be treated may also be a fluid that is a mixture comprising water.

In at least one aspect, the systems and methods described herein provide purified or treated water from a variety of source types. Possible water sources include well water, surface water, municipal water, and rain water. The treated product may be for general use or for human consumption or other domestic uses, for example, bathing, laundering, and dishwashing. As used herein, the term "treated" in reference to water or fluid, references water exhibiting properties that are suitable for residential or commercial applications. For example, in certain embodiments, treated water may have a conductivity in a range of from about 100 to about 400 μS/cm. In some embodiments, treated water may have a conductivity in a range of from about 250 to about 350 μS/cm. In some embodiments, the treated water may have an alkalinity in a range of from about 50 to about 200 ppm. In certain embodiments, the treated water may have an alkalinity in a range of from about 50 to about 150 ppm. In even other embodiments, the treated water may have an alkalinity in a range of from about 80 to about 120 ppm. In one or more embodiments, treated water may have a hardness in a range of from about 1 to about 10 gpg. According to some embodiments, treated water may have a hardness in a range of from about 1 to about 5 gpg. In certain other embodiments, treated water may have a hardness of about 4 gpg. The conductivity, alkalinity, and hardness of the treated water may be any value or range of values for these respective properties that is suitable for a desired residential and commercial application, and may be specifically tailored for a specific use or user.

In another aspect, the systems and methods described herein may be operated to reduce the likelihood of formation of any scale or foulants that are generated while producing treated water. The formation of scale or foulants in the treatment system, including its components, such as pumps, valves, and fluid lines, may be inhibited by substituting the flowing liquid from one having a high tendency to form scale to a liquid having a low to small tendency to produce scale, such as water having a low LSI.

The treatment system in accordance with one or more embodiments may receive water from a source and subsequently pass it through a treatment process to produce a product stream possessing targeted characteristics. The treatment system may have a water storage system in fluid communication with at least one or more treatment devices. Non-limiting examples of suitable treatment device may include: electrochemical water treatment devices, reverse osmosis devices, electrodialysis devices, ion exchange resin devices, capacitive deionization devices, microfiltration devices, and/or ultrafiltration devices.

In accordance with one or more embodiments a water treatment system for a residential or commercial application is provided. In some embodiments, the water treatment system includes an electrochemical water treatment device. The electrochemical water treatment device may include at least one ion exchange membrane. The at least one ion exchange membrane may be an anion exchange membrane, a cation exchange membrane, or a combination of both. For example, the device may include a series of alternating anion and cation exchange membranes. The electrochemical water treatment device may further comprise at least one compartment to house the ion exchange membrane(s). In certain embodiments, the electrochemical water treatment device may include a plurality of alternating depleting compartments and concentrating compartments positioned between a pair of electrodes. The pair of electrodes may be a cathode and an anode. The water treatment system may include a concentrate stream and a dilution stream. The concentrate stream and dilution stream may be in fluid communication with at least one ion exchange membrane. In certain embodiments, the at least one ion exchange membrane may be configured to provide a ratio of a pH of the concentrate stream and a pH of the dilution stream to be less than about 1.0. This may be possible due to one or more properties or characteristics of the ion exchange membrane(s) used to create the concentrate and dilution streams. For example, the ion exchange membranes may be configured to produce a dilution stream that has a pH that is consistently higher than a pH of the concentrate stream.

In at least one aspect, the systems and methods described herein provide a concentrate stream that may circulate through the electrochemical water treatment device. In certain aspects, the concentrate stream may have an LSI that inhibits scale formation. For example, the concentrate stream may have an LSI of less than or about 1, less than or about 0.5, or less than or about 0.2. In at least one aspect, the LSI of the concentrate stream may be about 0.2.

In some embodiments, the systems and methods described herein may provide liquids, such as water, having certain desired properties related to conductivity, alkalinity, pH, TDS and LSI. For example, the dilution stream may have a conductivity in a range of from about 250 to about 350 μS/cm. In various embodiments, the conductivity of the dilution stream may be about 300 μS/cm. In one or more embodiments, the dilution stream may have a pH that is greater than 7.0. In some embodiments, the dilution stream may have a pH in a range of from about 7.0 to about 8.0. In various embodiments, the dilution stream may have an alkalinity in a range of from about 80 ppm to about 150 ppm. For example, the dilution stream may have an alkalinity in a range of from about 90 ppm to about 120 ppm. In some embodiments, the dilution stream may have an alkalinity of about 100 ppm. In multiple embodiments, the water treatment system may be configured to produce a dilution stream with a hardness of about 4 gpg.

In one or more embodiments, the water treatment system does not require a separate source of acidic water for the concentrate stream, as may be the case for other types of water treatment systems. The separate source of acidic water may be necessary in other types of systems to maintain a desired pH of the concentrate stream. For example, other types of systems may require a separate cation exchange device that is in fluid communication with the concentrate stream. The cation exchange device may provide an intermittent or continuous supply of acidic water to the concentrate stream. This requirement may increase the cost and maintenance of the overall system. The water treatment systems described herein therefore offer the advantage of not requiring this type of equipment, thus minimizing or eliminating these additional costs.

In at least one embodiment, the water treatment system does not require a reverse polarity cycle. As will be appreciated by one of ordinary skill in the art, a controller may reverse the direction of the applied field from a power source to the electrochemical water treatment device according to a predetermined schedule or according to an operating condition, such as water quality, or any other operating parameter in the treatment system. The function of the concentrating and depleting compartments is also switched, as well as the functionality of the respective concentrate and dilution streams. Performing a reverse polarity cycle may add additional time, costs, complexity, and size to the system. The water treatment systems described herein thus allow a distinct advantage over other types of systems that may require reverse polarity cycles as part of the operating process.

Figure 4:
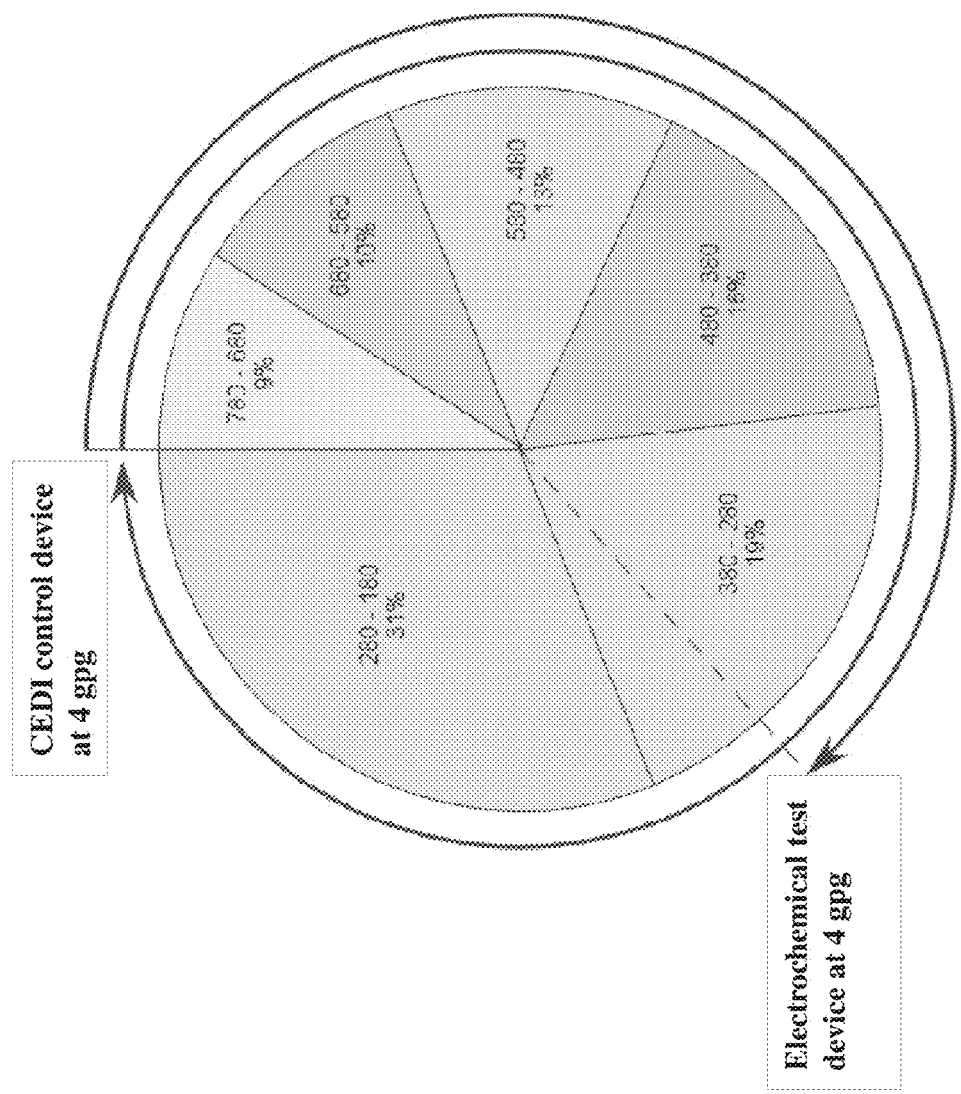
FIG. 4 is a chart illustrating at least one result from a comparison study performed in accordance with one or more embodiments.

Various aspects of the water treatment systems and methods disclosed herein may provide operationally cost effective advantages over other systems currently available on the market. For example, with reference to FIG. 4, and as will be discussed in further detail below, the electrochemical water treatment device may be capable of providing the same treated water (for example, provide water with a hardness of 4 gpg), but the process may be much shorter in duration. This efficiency may be linked to a characteristic of the ion exchange membranes that are used in the electrochemical water treatment device. For example, the membranes may be particularly selective to calcium, thus affecting hardness, and the speed at which the feed water is cleaned. Further, the LSI of the concentrate stream may be very low (for example, 0.1-0.2), keeping scaling to a minimum without the requirement for any additional equipment or materials. This benefit may also be attributed to one or more characteristics of the ion exchange membranes. For example, the membranes may be particularly less selective to bicarbonate, thus affecting the alkalinity and the subsequent pH.

In various embodiments, the ion exchange membranes may possess properties related to selectivity of one or more ions. For example, the membranes may be selective toward calcium and de-selective toward bicarbonate. This may contribute toward one or more advantages of the disclosed system over other types of water treatment systems. For example, other systems may require an additional source of acidic water to maintain or provide a low pH in the concentrate stream, and may require periodic reverse polarity cycling to maintain certain levels of operating efficiencies. The elimination of these additional pieces of equipment and processes may allow the disclosed electrochemical water treatment devices to decrease processing time, reduce module size, reduce module duty cycle, increase production rate, and reduce the cost, complexity, and size of the overall system.

In accordance with one or more embodiments, a method of treating water for a residential or commercial application is provided. The method may include feeding water from a point of entry to an electrochemical water treatment device. In some instances, the feed water may have a conductivity of at least about 1000 μS/cm. The point of entry may include water from any one of the water sources previously discussed. The method may further comprise passing the feed water through the concentrating and diluting compartment of the electrochemical water treatment device to produce a concentrate stream and a product stream. In certain instances, the product stream may have a conductivity of about 300 μS/cm. In at least one embodiment, a ratio of a pH of the concentrate stream to a pH of the product stream is less than about 1.0. In other embodiments, the ratio of the pH of the concentrate stream to the pH of the product stream is about 0.9. In at least one embodiment, the method comprises recirculating the concentrate stream. According to some embodiments, the pH of the recirculating concentrate stream is less than or about 7.0. The method may further comprise calculating an LSI of the concentrate stream. In some embodiments, the LSI of the concentrate stream is less than about 1.0. In further embodiments, the LSI of the concentrate stream is less than or about 0.5. According to some aspects, the method further comprises storing at least a portion of the product stream and measuring a conductivity, an alkalinity, and a pH of the stored portion of the product stream. According to at least one embodiment, the conductivity, the alkalinity, and the pH of the stored portion of the product stream are about 300 μS/cm, about 100 ppm, and greater than about 7.0, respectively. In certain aspects, the method further comprises calculating an LSI of the concentrate stream. In at least one example, the LSI of the concentrate stream is about 0.2. In various embodiments, the method does not require the addition of a separate source of acidic water to the concentrate stream. In certain embodiments, the method does not require a reverse polarity cycle.

According to one or more aspects, the electrochemical water treatment device may include at least one ion exchange membrane. The ion exchange membranes may include anion and cation exchange membranes. In various aspects, ion exchange membranes may have low electrical resistance, high permselectivity, high chemical stability, and high mechanical strength. In at least one aspect, an ion exchange membrane may have a resistivity of less than about 1.5 Ohm-cm$^2$ and an apparent permselectivity of at least about 95%. Ion exchange membranes that are suitable for use in the systems and methods disclosed herein are available from Evoqua Water Technologies.

The electrical resistivity of an ion exchange membrane is generally an expression of how strongly the membrane resists the flow of electric current. When resistivity is high, more current, and thus more energy, may need to be applied to the electrochemical cell to facilitate ion transfer across the membrane to perform the desired electrochemical separation process. As used herein, the terms "electrical resistance" and "electrical conductivity" may be used interchangeably and refer to the resistance of a material to the flow of electrical current and may be expressed as electrical resistance per unit area ($\Omega$ cm$^2$). The electrical resistance of a membrane may be determined by the ion-exchange capacity and the mobility of an ion within a membrane matrix. In general, electrical resistance is proportional to ion concentration, meaning that electrical resistance increases with increasing ion concentration. Thus, in general, the lower the resistivity of the ion exchange membrane, the more efficient the membrane. In electrochemical processes, it may be desirable to use ion exchange membranes with low electrical resistance, since they may save energy and reduce ohmic losses during operation.

As used herein, the term "permselectivity" refers to an ion exchange membrane's ability to be permeable to one chemical species but impermeable with respect to another chemical species. For example, in certain instances the ion exchange membrane may be permeable to counter-ions, but impermeable to co-ions. This means, for example, that when an electric current is applied to an electrochemical cell having both anion and cation exchange membranes, cations in solution will cross the cation membrane but anions will not cross. When, as in this example, anions are allowed to cross the cation membrane, the overall efficiency of the process is reduced. In certain instances it may be desirable to have membranes with a high permselectivity, where the membranes are highly permeable to counter-ions and highly impermeable to co-ions.

The ion exchange membrane may be constructed from a polymeric substrate that is covered by a polymeric layer. In various aspects, the polymeric layer may be cross-linked. In at least one embodiment, the cross-linked polymeric layer may react with the polymeric substrate to yield a hydrophobic surface.

The ion exchange membranes may comprise polymeric materials that facilitate the transport of either positive or negative ions across the membrane. Ion exchange membrane properties, including resistivity and permselectivity, may be controlled, in part, by the amount, type, and distribution of fixed ionic groups in the membrane. For example, strong base anion exchange membranes may generally comprise quaternary amines, and weak base anion exchange membranes may generally comprise tertiary amines. The amines may have fixed positive charges that allow anionic species to permeate across the membrane.

In various embodiments, the ion exchange membranes may be generally heterogeneous membranes. The heterogeneous membranes may include a polymeric layer that is coated on top of a substrate and the polymeric layer may provide fixed charges on the outer surface of the membrane. In other embodiments, the ion exchange membranes may be generally homogeneous. Homogeneous membranes may be produced by the polymerization of monomers and may include a polymeric microporous substrate. Reactive monomers may be used to fill the pores of the substrate, yielding a membrane with a highly uniform microstructure. The reactive monomers may be selected to functionally remove specific ions. For example, the reactive monomer may be selected to remove bicarbonate.

In one or more aspects, the methods and systems described herein provide treated water while decreasing the ionic load discharged from the treatment system. For example, the total amount of waste water discharged as a result of the treatment process may be significantly less than conventional treatment processes, and may be less than 25%, less than 20%, or less than 10% of the total volume of water treated.

One or more embodiments of the treatment systems disclosed here may include one or more fluid control devices, such as pumps, valves, regulators, sensors, pipes, connectors, controllers, power sources, and any combination thereof.

In accordance with one or more embodiments, the treatment systems disclosed here may comprise one or more pumps. A variety of pumps for pumping and/or circulating fluid may be used in conjunction with the treatment system. Pumps may be internal and/or external to one or more of the components of the treatment system, and/or may be otherwise integrated with the treatment system. Non-limiting examples of pumps include electrical pumps, air driven pumps, and hydraulic pumps. The pump may be driven by a power source that can be any conventional power source, for example, gasoline driven motors, diesel driven motors, solar-powered motors, electric motors, and any combination thereof.

In accordance with one or more embodiments, the methods and systems disclosed here further comprise one or more valves. Non-limiting examples of valves suitable for control according to one or more embodiments include, but are not limited to, check valves, gate valves, bypass valves, solenoid valves, other types of hydraulic valves, other types of pneumatic valves, relief valves, and any combination thereof. Suitable valves include one-way and/or multi-way valves. In certain non-limiting embodiments, the valve can be a pilot valve, a rotary valve, a ball valve, a diaphragm valve, a butterfly valve, a flutter valve, a swing check valve, a clapper valve, a stopper-check valve, a lift-check valve, and any combination thereof. The valves may be manually actuated (for example, by an operator) and/or hydraulically, pneumatically, solenoid, or otherwise actuated, including control actuated by a process controller or control system. The valves may be an on/off type of valve, or may be a proportional type of valve.

The treatment system, in some embodiments of the systems and methods described herein, further comprises one or more sensors or monitoring devices configured to measure at least one property of the water or an operating condition of the treatment system. Non-limiting examples of sensors include composition analyzers, pH sensors, temperature sensors, conductivity sensors, pressure sensors, and flow sensors. In certain embodiments, the sensors provide real-time detection that reads, or otherwise senses, the properties or conditions of interest. A few non-limiting examples of sensors suitable for use in one or more embodiments include optical sensors, magnetic sensors, radio frequency identification (RFID) sensors, Hall effect sensors, and any combination thereof.

In one or more embodiments, an RFID antenna can be used to provide positional and other information regarding the treatment system, such as one or more water properties. The RFID antenna senses the targeted information and an associated RFID antenna control processor can transmit the information to a system processor, thereby providing one method of in-line real-time process control.

In certain non-limiting embodiments of the systems and methods described herein, the treatment system further comprises a flowmeter for sensing the flow of fluid. A non-limiting example of a flowmeter suitable for certain aspects of the treatment system disclosed here includes a Hall effect flowmeter. Other non-limiting examples of flowmeters suitable for certain aspects of the treatment system include mechanical flowmeters, including a mechanical-drive Woltman-type turbine flowmeter.

According to one or more aspects, the systems and methods disclosed herein may include a control system disposed or configured to receive one or more signals from one or more sensors in the treatment system. The control system can be further configured to provide one or more output or control signals to one or more components of the treatment system. One or more control systems can be implemented using one or more computer systems. The computer system may be, for example, a general-purpose computer such as those based on an Intel PENTIUM®-type processor, a Motorola PowerPC® processor, a Sun UltraS-PARC® processor, a Hewlett-Packard PA-RISC® processor, or any other type of processor or combinations thereof. Alternatively, the computer system may include PLCs, specially-programmed, special-purpose hardware, for example, an application-specific integrated circuit (ASIC), or controllers intended for analytical systems.

In some embodiments, the control system can include one or more processors connected to one or more memory devices, which can comprise, for example, any one or more of a disk drive memory, a flash memory device, a RAM memory device, or other device for storing data. The one or more memory devices can be used for storing programs and data during operation of the treatment system and/or a control subsystem. For example, the memory device may be used for storing historical data relating to the parameters over a period of time, as well as current operating data. Software, including programming code that implements embodiments of the systems and methods disclosed herein, may be stored on a computer readable and/or writeable nonvolatile recording medium, and then copied into the one or more memory devices where it can then be executed by the one or more processors. Such programming code may be written in any of a plurality of programming languages, for example, ladder logic, Java, Visual Basic, C, C#, or C++, Fortran, Pascal, Eiffel, Basic, COBOL, or any of a variety of combinations thereof.

Components of a control system may be coupled by one or more interconnection mechanisms, which may include one or more busses, for example, between components that are integrated within a same device, and/or one or more networks, for example, between components that reside on separate discrete devices. The interconnection mechanism enables communication, for example, data, instructions, to be exchanged between components of the system.

The control system can further include one or more input devices, for example, a keyboard, mouse, trackball, microphone, touch screen, and one or more output devices, for example, a printing device, display screen, or speaker. In addition, the control system may contain one or more interfaces that can connect to a communication network, in addition to or as an alternative to the network that may be formed by one or more of the components of the control system.

According to one or more embodiments, one or more input devices may include one or more sensors for measuring the one or more parameters of the fluids in the treatment system. Alternatively, the sensors, the metering valves and/or pumps, and/or all of these components, may be connected to a communication network that is operatively coupled to a control system. For example, sensors may be configured as input devices that are directly connected to the control system. Additionally, metering valves and/or pumps of the one or more sources of treating compositions may be configured as output devices that are connected to the control system, and any one or more of the above may be coupled to another ancillary computer system or component so as to communicate with the control system over a communication network. Such a configuration permits one sensor to be located at a significant distance from another sensor or allows any sensor to be located at a significant distance from any subsystem and/or the controller, while still providing data therebetween.

In certain embodiments, a computer can be coupled to a server and to a plurality of different input devices. The input devices may include, for example, a wireless communication device (for example, a radio frequency identification (RFID) antenna), one or more sensors, a touch screen having a virtual keyboard, and one or more monitoring devices. For purposes of this disclosure, the term "monitoring" may be defined to include, in a non-limiting manner, acts such as recording, observing, evaluating, identifying, etc. In addition, the RFID antenna, any of the sensors, and/or the touch screen, may be configured to operate both as input devices and/or output devices. The touch screen is optional and may alternatively include other known input devices such as a keyboard, mouse, touch pad, joystick, remote control (either wireless or with a wire), track ball, mobile device, etc.

In certain non-limiting embodiments, a computer is wirelessly coupled to a server and an RFID antenna and one or more other sensors. The RFID antenna may receive input from an RFID device, such as a tag device, secured or otherwise in communication to one or more components of the treatment system. The RFID device can be programmed to include a wide range of information, and additional monitoring information collected during one or more water treatment cycles can be added to the RFID device. When the RFID device is in communication with the RFID antenna, any information programmed into the RFID device can be downloaded onto the computer and transferred to the server. The RFID device may also include an encryption device.

The control system can include one or more types of computer storage media such as readable and/or writeable nonvolatile recording medium in which signals can be stored that define a program to be executed by one or more processors. The storage or recording medium may be, for example, a disk or flash memory. In operation, the processor can cause data, such as code that implements one or more embodiments of the systems and methods disclosed herein, to be read from the storage medium into a memory device that allows for faster access to the information by the one or more processors. The memory device is a volatile, random access memory such as a dynamic random access memory (DRAM), or static memory (SRAM), or any other suitable devices that facilitate information transfer both to and from the one or more processors.

In certain embodiments, the treatment system also includes a controller for adjusting, monitoring, or regulating at least one operating parameter and its components of the treatment system. A controller comprises a microprocessor-based device, such as a programmable logic controller (PLC) or a distributed control system that receives or sends input and output signals to one or more components of a treatment system. In certain embodiments, the controller regulates the operating conditions of the treatment system in an open-loop or closed-loop control scheme. For example, the controller, in open-loop control, can provide signals to the treatment system such that water is treated without measuring any operating conditions. The controller can also control the operating conditions in closed-loop control so that any one or more operating parameters can be adjusted based on an operating condition measured by, for example, a sensor. In yet another embodiment, the controller can further comprise a communication system, for example, a remote communication device, for transmitting or sending the measured operating condition or operating parameter to a remote station.

The controller, or components or subsections thereof, may alternatively be implemented as a dedicated system or as a dedicated programmable logic controller (PLC) in a distributed control system. Further, it should be appreciated that one or more features or aspects of the systems and methods disclosed herein may be implemented in software, hardware or firmware, and any combination thereof. For example, one or more segments of an algorithm executable by the one or more controllers can be performed in separate computers, which in turn, can be communicated through one or more networks.

Figure 2:
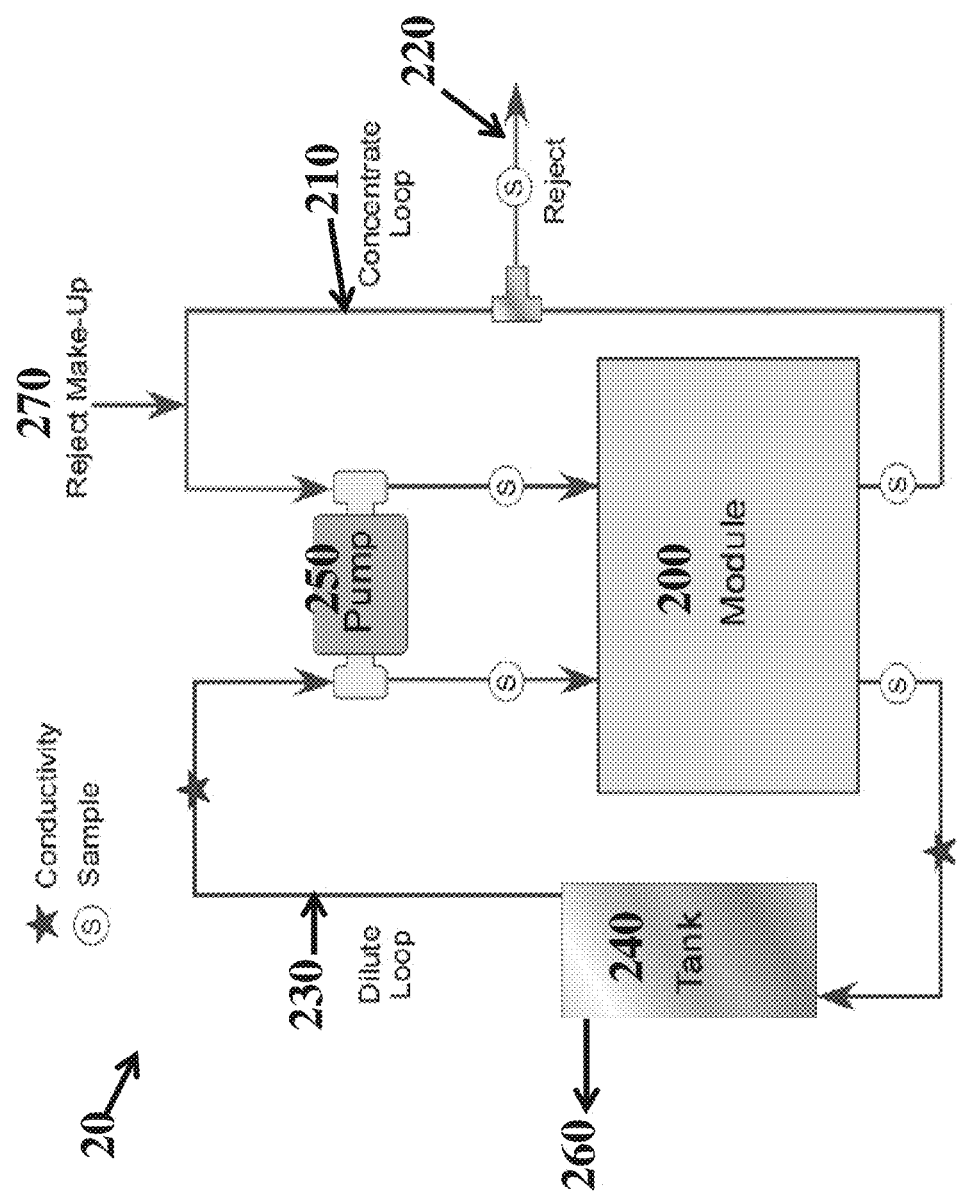
FIG. 2 is a process flow diagram of a water treatment system in accordance with one or more embodiments.

FIG. 2 is a process flow diagram of a water treatment system 20 in accordance with one or more embodiments. The water treatment system includes an electrochemical water treatment device 200. Electrochemical water treatment device 200 may have a series of alternating cation and anion exchange membranes positioned between a cathode and anode. The treatment system may further include a concentrate stream 210 and dilution stream 230 that are in fluid communication with at least one ion exchange membrane in the electrochemical water treatment device 200. The concentrate and dilution streams may also be in fluid communication with a manifold (not shown), which functions to collect liquid exiting from one or more compartments of the electrochemical water treatment device 200. For example, a storage tank 240 may be in fluid communication with the dilution stream 230 and function to store treated water 260 for further use. Concentrate stream 210 and dilution stream 230 may also be in fluid communication with a pump 250 that functions to circulate the respective streams throughout the water treatment system 20. Water treatment system 20 may further include a reject or waste stream 220 and a reject make-up stream 270 that are in fluid communication with the concentrate stream 210.

Figure 3:
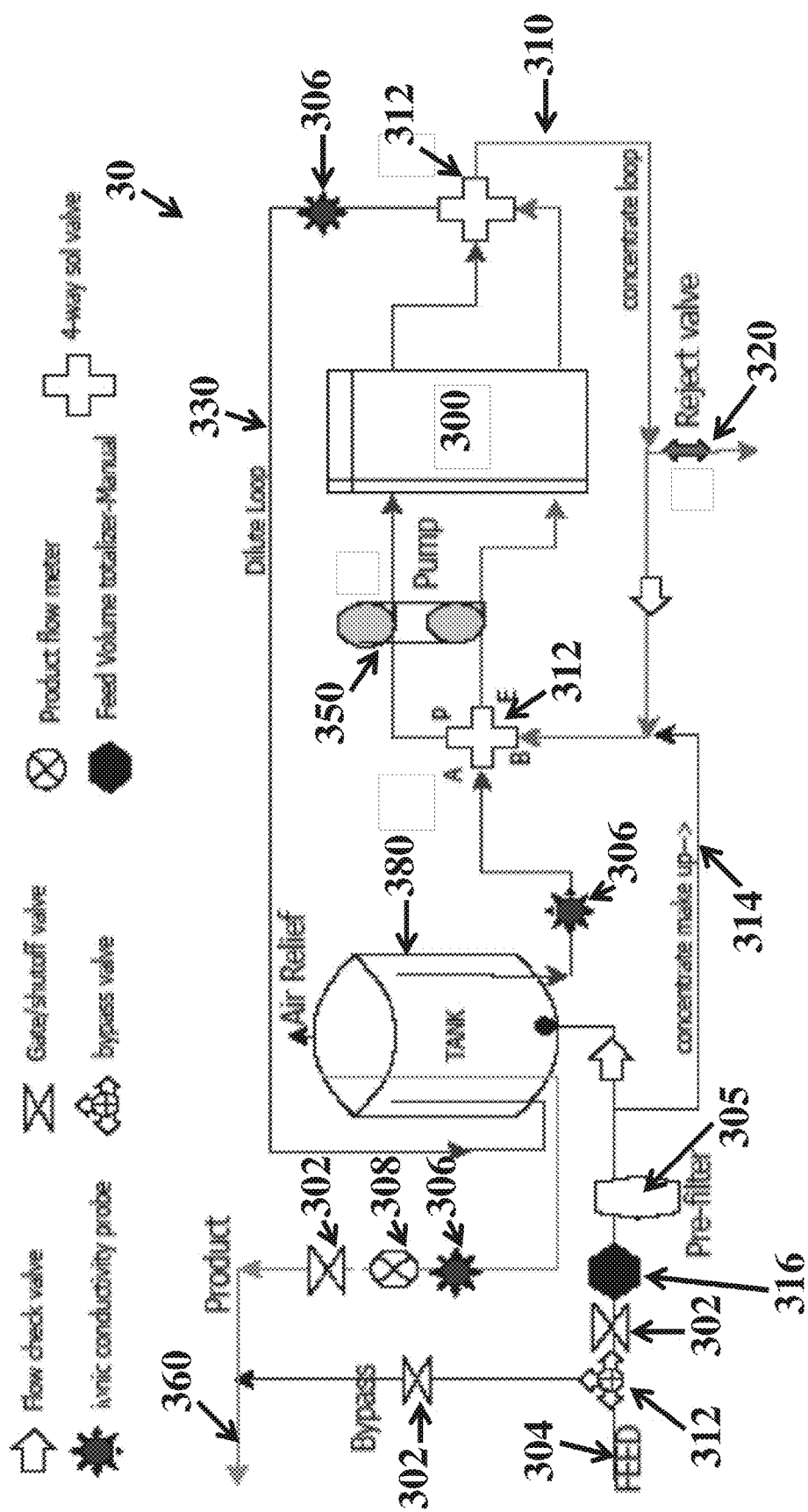
FIG. 3 is a process flow diagram of a water treatment system in accordance with one or more embodiments.

FIG. 3 is another process flow diagram of a treatment system 30 according to one or more embodiments. A liquid circuit is illustrated where a feed stream 304 is introduced to treatment system 30. The feed stream 304 may provide or be in fluid communication with a water source. Non-limiting examples of the water source include potable water sources, for example, municipal water, well water, non-potable water sources, for example, brackish or salt-water, pre-treated semi-pure water, and any combination thereof. In some instances, a treatment system, for example, a purification system, and/or a chlorine removal system, treats the water before it comprises the feed stream. The feed stream may contain dissolved salts or ionic or ionizable species including sodium, chloride, chlorine, calcium ions, magnesium ions, carbonates, sulfates or other insoluble or semi-soluble species or dissolved gases, such as silica and carbon dioxide. The feed stream may also contain additives, such as fluoride, chlorate, and bromate species.

In accordance with one or more embodiments, treatment system 30 includes a fluid distribution system. The distribution system comprises components that are fluidly connected to provide fluid communication between components of the treatment system, for example, providing fluid communication between treated water from storage system 380, to product stream 360. The distribution system can comprise any arrangement of pipes, valves, tees, pumps, manifolds, and any combination thereof, to provide fluid communication throughout treatment system 30 and throughout one or more product streams or storage systems available to a user. In certain embodiments, the distribution system further comprises a household or residential water distribution system including, but not limited to, connections to one or more points of use such as, a sink faucet, a showerhead, a washing machine, and a dishwasher. For example, treatment system 30 may be connected to the cold, hot, or both, water distribution systems of a household. Pumps and vacuum sources may be in fluid communication with various components of the fluid distribution system for purposes of controlling liquid flow by pressurizing the liquid. The pressurized liquid stream may further comprise a regulator where the pressure can be more readily controlled. Fluid may also be caused to flow by gravity.

The liquid circuit may further comprise one or more bypass valves 312 which may allow liquid to flow through one part of water treatment system 30 and prevent flow through another part of the system. For example bypass valve 312 may function to allow fluid from feed stream 304 to bypass water treatment system 30 and exit with product stream 360, or conversely allow feed stream 304 to flow into the water treatment system through valve 302, flowmeter 316, and pre-filter 305.

Pre-filter device 305 may be a preliminary filter or pre-treatment device designed to remove a portion of any undesirable species from the water before the water is further introduced into one or more components of treatment system 30. Non-limiting examples of pre-filter devices include, for example, carbon or charcoal filters that may be used to remove at least a portion of any chlorine, including active chlorine, or any species that may foul or interfere with the operation of any of the components of the treatment system process flow. Additional examples of pre-treatment devices include, but are not limited to, ionic exchange devices, mechanical filters, and reverse osmosis devices. Pre-treatment systems can be positioned anywhere within treatment system 30. For example, water that enters storage system 380 after being treated by electrochemical water treatment device 300 may contain little or no chlorine (or any other alternative disinfectant). To retain a residual chlorine level in storage system 380, the water can be mixed with untreated water from feed stream 304. Preferably, the chlorinated water is added at a rate adequate to result in mixed water that contains enough chlorine to inhibit bacteriologic activity. Active chlorine refers to chlorine containing species that exhibit anti-microbial activity. An effective chlorine concentration is defined herein as a concentration of active chlorine compounds, for example, sodium hypochlorite that inhibits the growth of bacteria, such as *e-coli*, in storage system 380. Therefore, the ratio at which the feed water and treated water are mixed in storage system 380 may be dependent upon a number of factors, including the efficiency of electrochemical water treatment device 300, the desired effective chlorine concentration, the rate at which water contained in storage system 380 is depleted, the temperature of storage system 380, and the source and quality of the feed water. Pre-treatment devices may also be, for example, a particulate filter, aeration device, or a chlorine-reducing filter, and may comprise several devices, or a number of devices arranged in parallel or in a series. Pre-treatment device 305 can be positioned upstream or downstream of the storage system 380, or positioned upstream of electrochemical water treatment device 300 so that at least some chlorine species are retained in the storage system 380 but are removed before water enters the electrochemical water treatment device 300.

In accordance with certain embodiment of the systems and methods described herein, treatment system 30 may also comprise one or more probes or sensors 306, for example, a water property sensor, capable of measuring at least one physical property in treatment system 30. For example, the sensor 306 can be a device that measures water conductivity, pH, temperature, pressure, composition, and/or flow rates. The probe or sensor can be installed or positioned within treatment system 30 to measure a particularly preferred water property. For example, a probe or sensor 306, can be a water conductivity sensor installed in or otherwise placed in fluid communication with storage system 380 so that it measures the conductivity of the water. This may provide an indication of the quality of water available for product stream 360. In another embodiment, the probe or sensor can comprise a series or a set of sensors in various configurations or arrangements in treatment system 30. The set of sensors can be constructed, arranged, and connected to a controller so that the controller can monitor, intermittently or continuously, the quality of water in, for example, storage system 380. This arrangement allows the performance of treatment system 30 to be further optimized.

In accordance with other embodiments of the systems and methods described herein, treatment system 30 may include a combination of sets of sensors in various locations in the liquid streams or other components throughout treatment system 30. For example, the probe or sensor can be a flow sensor measuring a flow rate from feed stream 304, and can further include any one or more of a pH meter, a nephelometer, a composition analyzer, a temperature sensor, and a pressure sensor monitoring the operating conditions of treatment system 30.

Storage system 380 may store or accumulate water from feed stream 304 and may also serve to store treated water for product stream 360 and may further provide water to electrochemical water treatment device 300. In accordance with some embodiments of the systems and methods described herein, storage system 380 comprises a tank, vessel or reservoir that has inlets and outlets for fluid flow. In certain non-limiting embodiments, the storage system comprises a tank that has a volume capacity in a range of from about 5 gallons to about 200 gallons. In certain non-limiting embodiments, storage system 380 may comprise several tanks or vessels, and each tank or vessel, in turn, may have several inlets and/or outlets positioned at various locations. The inlets and outlets may be positioned on each vessel at various locations depending on, among other things, the demand and flow rate to product stream 360, the capacity or efficiency of electrochemical water treatment device 300, and the capacity or hold-up of storage system 380.

Storage system 380 may further comprise various components or elements that perform desirable functions or avoid undesirable consequences. For example, the tanks or vessels may have internal components, such as baffles, that are positioned to disrupt any internal flow currents or areas of stagnation. In some embodiments, storage system 380 further comprises a heat exchanger for heating or cooling the stored fluid. For example, storage system 380 may comprise a vessel constructed with a heating coil, which can have a heating fluid at an elevated temperature relative to the temperature of the fluid in the vessel. The heating fluid can be hot water in a closed-loop flow with a furnace or other heat-generating unit so that the heating fluid temperature is raised in the furnace. The heating fluid, in turn, raises the vessel fluid temperature by heat transfer. Other examples of auxiliary or additional components include, but are not limited to, pressure relief valves designed to relieve internal pressure in the storage system. In accordance with further embodiments, the treatment system can comprise at least two tanks or vessels or two zones in one or more tanks or vessels, each of which can be, at least partially, fluidly isolated from the other. For example, the treatment system can comprise two vessels fluidly connected to a feed stream and to one or more treatment devices. The two tanks or vessels can be fluidly isolated from each other by conduits and valves so that the first can be placed in service with one or more treatment devices while the second can be removed from service for, for example, maintenance or cleaning. In accordance with one or more embodiments of the systems and methods described herein, the tank or reservoir system is connected to, or in thermal communication with, a heat exchanger and, optionally, to a fluid treatment device. The fluid treatment device can be an electrochemical water treatment device, a reverse osmosis device, an ion-exchange resin bed, an electrodialysis device, a capacitive deionization device, or combinations thereof.

In certain embodiments, liquid exiting electrochemical water treatment device 300 as dilution stream 330 may be directed by valve 312 to storage system 380. In addition, storage system 380 may store or accumulate water from feed stream 304. Thus, storage system 380 may include treated water as well as untreated, or minimally treated, water. Storage system 380 may be configured so that these two sources of water are mixed together, or alternatively, the two water sources may be segregated. For example, one source of water may enter the bottom of storage system 380 through one or more inlets and proceed in plug-flow manner in an upward direction to one or more outlets positioned at the top of storage system 380.

In various embodiments, a dilution stream 330 may flow in a circulating loop through electrochemical water treatment device 300. The circulating dilution stream may provide fluid communication between one or more depletion compartments in electrochemical water treatment system 300 and storage system 380. Likewise, a concentrate stream 310 may flow in a circulating loop through electrochemical water treatment device 300 and may be in fluid communication between one or more concentration compartments in electrochemical water treatment device.

Water treatment system 30 may further include one or more gate valves 302 and flow meters 308. For example, the fluid path flowing from storage system 380 to product stream 360 may include gate valve 302, flow meter 308, and one or more sensors 306, for example, an ionic conductivity probe. In one or more embodiments, concentrate stream 310 may include water from concentrate make-up stream 314 that is fed from feed stream 304 and passes through pre-filter 305. A valve (not shown) may be positioned at the junction of the concentrate make-up stream 314 and concentrate stream 310.

In certain non-limiting embodiments, the valve 312 may be a solenoid valve. The solenoid valve may be a one-way or multi-way valve, including three-way and four-way valves. The solenoid valve may be an on/off type of valve, a proportional type of valve, and any combination thereof. For example, a four-way solenoid valve 312 may include a first port that is in fluid communication a concentrate compartment of electrochemical water treatment device. A second port may be in fluid communication with a dilution compartment of electrochemical water treatment device 300. A second four-way solenoid valve 312 may be positioned downstream of one or more outlets of electrochemical water treatment device 300. For example, a first and second port of valve 312 may be in fluid communication with an outlet of a concentrate and dilution chamber of electrochemical water treatment device 300, and feed the concentrate stream and dilution stream respectively.

In one or more embodiments, a control system may be in communication with a multi-way valve. For example, a three-way solenoid valve may allow either one of two incoming fluids to be directed to an outlet. When the valve is in the "off" position, fluid flow from one of the incoming fluid streams may be interrupted. When the valve is in the "on" position fluid flow from the other incoming fluid stream may be interrupted. For example, valve 312 may be used to direct fluid flow from concentrate stream 310 and storage system 380 to electrochemical treatment device 300. The exact selection of which or both of these streams may be used may be controlled by one or more components of the control system.

Treatment system 30 may further comprise a liquid circuit that allows fluid communication between one or more outlets of electrochemical water treatment device 300, and storage system 380. For example, a third port of valve 312 may be in fluid communication with at least one outlet of electrochemical water treatment device 300. In certain embodiments, the outlet of the electrochemical water treatment device comprises ion-depleted water from one or more depletion compartments of electrochemical water treatment device 300. A fourth port of valve 312 may be in fluid communication with a sensor 306, for example, an ionic conductivity probe. The liquid circuit may also be in fluid communication with at least one inlet to storage system 380. An outlet of storage system 380 may be in fluid communication with at least one inlet to electrochemical water treatment device 300. The liquid circuit may include one or more pumps 350 to aid in directing fluid throughout the treatment system 30, for example, for directing fluid into one or more inlets of electrochemical water treatment device 300.

The systems and methods described herein further provide a treatment system where a controller may provide a signal that actuates a valve so that fluid flow is adjusted based on a variety of operating parameters. These parameters may include, but are not limited to, the properties of water from feed stream 304, the properties of water in storage system 380, the properties of water in dilution stream 330, the properties of water in concentrate stream 310, and any combination thereof. Other parameters may include the properties of water exiting storage system 380, the demand of water necessary to provide to product stream 360, the operating efficiency or capacity of electrochemical water treatment device 300, the operating parameters associated with electrochemical water treatment device 300, and any combination thereof. Specific measured parameters may include, but are not limited to, water conductivity, pH, turbidity, composition, temperature, pressure, flow rate, and any combination thereof.

In one or more embodiments, a controller may receive signals from one or more sensors so that the controller is capable of monitoring the operating parameters of treatment system 30. For example, a conductivity sensor may be positioned within storage system 380 so that the conductivity is monitored by the controller. In one or more embodiments, a controller may receive a signal from one or more sensors so that the controller is capable of monitoring the operating parameters of the dilution stream, such as conductivity. In operation, the controller may increase, decrease, or otherwise adjust the voltage, current, or both, supplied from a power source to one or more components of the treatment system. The controller may include algorithms that may modify an operating parameter of treatment system 30 based on one or more measured properties of the liquid flowing in the system. For example, in some embodiments, the controller may increase or decreases the flow rate of the concentrate stream 310 and the dilution stream 330.

The controller may be configured, or configurable by programming, or may be self-adjusting such that it is capable of maximizing any of the service life, the efficiency, or reducing the operating cost of treatment system 30. For example, the controller may include a microprocessor having user-selectable set points or self-adjusting set points that adjust the applied voltage, current, or both, to valve(s) 312, the flow rate through concentrate stream 310, and the flow rate out to discharge stream 320.

In accordance with another embodiment of the systems and methods described herein, the controller regulates the operation of the treatment system by incorporating adaptive or predictive algorithms, which are capable of monitoring demand and water quality and adjusting the operation of any one or more components of the treatment system 30. For example, in a residential application, the controller may be predictive in anticipating higher demand for treated water during early morning hours to supply product stream 360 that services a showerhead.

In certain non-limiting embodiments, radio frequency identification (RFID) is utilized to provide real-time detection of certain properties or conditions in treatment system 30. In certain embodiments, a plurality of inline identifying tag readers or optical sensors are configured to track or sense certain properties or conditions of the liquid as it is transported through the treatment system. The RFID may be combined with one or more additional sensors, for example, a flowmeter. For example, an embedded tag may be placed in the cartridge of pre-filter device 305 and used in combination with a flowmeter to determine various properties or conditions, for example, the usable volume remaining in the cartridge, and the number of days remaining before the cartridge is exhausted and needs to be replaced.

In certain non-limiting embodiments, valves 312 can be actuated to provide liquid to be treated from storage system 380 to electrochemical water treatment device 300 and transfer the treated liquid to storage system 380. In some arrangements, the liquid circuit may include connections so that untreated liquid may be mixed with liquid that would exit any of the electrode compartments of electrochemical water treatment device 300. In several embodiments, the liquid circuit may further include connections to and from storage system 380 so that, for example, treated liquid exiting the depleting compartment of electrochemical water treatment device 300 may be transferred to storage system 380 and mixed with untreated liquid from feed stream 304. The resulting mixture may be delivered to product stream 360, and, optionally, to the one or more ion exchange membranes of the electrochemical water treatment device 300 in parallel or series flow paths.

In accordance with another embodiment of the systems and methods described herein, a controller, through a sensor or set of sensors, may monitor or measure at least one water property of the water storage system 380 and also measure a flow rate flowing in product stream 360. The controller may adjust an operating parameter of electrochemical water treatment device 300 and/or valve 312 based on the measured properties. In one or more embodiments of the systems and methods described herein, one or more sensors may measure at least one property of feed stream 304 and water in storage system 380.

In certain embodiments, storage system 380 may be connected downstream of feed stream 304 and may be in fluid communication with electrochemical water treatment device 300. For example, water from feed stream 304 may flow in and mix with the bulk water contained within storage system 380. Bulk water may exit storage system 380 and be directed to product stream 360 or exit through and be directed through valve 312 into electrochemical water treatment device 300 for treatment. In certain embodiments, treated water leaving electrochemical water treatment device 300 may mix with water from feed stream 304 by entering storage system 380. In this way, a liquid circuit may be formed between storage system 380, electrochemical water treatment device 300 and feed stream 304, and may function as a method for replenishing the water leaving the system 30 via product stream 360.

In accordance with further embodiments of the systems and methods described herein, one or more disinfecting and/or cleaning apparatus components may be utilized with the treatment system. Such disinfecting or cleaning systems can comprise any apparatus that destroys or renders inactive, at least partially, any microorganisms, such as bacteria, that can accumulate in any component of the treatment system. Examples of cleaning or disinfecting systems include those that can introduce a disinfectant or disinfecting chemical compounds, such as halogens, halogen-donors, acids or bases, as well as systems that expose wetted components of the treatment system to hot water temperatures capable of sanitization. In accordance with still further embodiments of the systems and methods described herein, the treatment system may include final stage or post treatment systems or subsystems that provide final purification of the fluid prior to delivery at a point of use. Examples of such post treatment systems include, but are not limited to those that expose the fluid to actinic radiation or ultraviolet radiation, and/or ozone or remove undesirable compounds by microfiltration or ultrafiltration. Thus, the treatment system may be utilized for household service and installed, for example, under a sink and provide treated water that is further treated by exposure to ultraviolet radiation before being delivered to a point of use, such as a faucet.

In accordance with further embodiments, the treatment system may comprise systems and techniques that permit disinfection of any component of the treatment system. For example, the treatment system may be exposed to a disinfecting solution or a disinfectant. The disinfectant may be any material that can destroy or at least render inactive at least a portion of any viable microorganisms, such as bacteria, present in any component or subsystem of the treatment system. Examples of disinfectants may include bases, acids, or sanitizers, such as a halogen or halogen-donating compounds and peroxygen or peroxygen-donating compounds that destroy or render bacteria inactive. The disinfectant may be introduced into the treatment system by any suitable device or technique. For example, chlorine may be introduced into the storage system. Chlorine may be introduced by injection of a hypochlorate species from a disinfectant reservoir fluidly connectable to any suitable portion of the treatment system. The chlorinated water can be further circulated through at least a portion of the treatment system thereby exposing wetted portions of the system to the disinfectant.

In accordance with another embodiment, discharge water comprising, for example, water exiting the system via waste or reject stream 320 may be used for auxiliary purposes to serve or provide additional or secondary benefits. For example, discharge water may be used to provide, for example, irrigating water to residential and commercial, and industrial uses. Discharge water may also be used for recovery of collected or concentrated salts.

In one or more embodiments, the treatment system may include a mixing system that is fluidly connected to at least one of a fluid distribution system and a storage system. The mixing or blending system may include one or more connections in the fluid distribution system as well as connections to a feed stream. The mixing system may provide fluid mixing of, for example, untreated water with treated water to produce service water that may be fed to one or more product streams. For example, the mixing system may comprise at least one tee, a mixing tank, or both, that fluidly connects an outlet of the storage system and the feed stream. The mixing system, in some cases, may include a valve that regulates the flow of any of the untreated water streams, treated water streams, and any other stream flowing to the product streams. In another embodiment, the valve may be a proportional valve that mixes the treated water with untreated water according to a predetermined ratio. In another embodiment, the valve may be actuated by a controller based on, for example, the flow rate, the water property, and the particular service associated with the product stream. For example, if low hardness water is required for the product stream, then the controller may regulate the amount of untreated water, if any, that can be mixed with treated water by actuating a valve. This may be accomplished by using closed-loop control with a sensor measuring the conductivity of the mixed water stream. In another embodiment, the valve may regulate the flow rate of the treated water that is mixed with the untreated water according to certain requirements of the product stream. In other embodiments, the treatment device may be operated to reach a set-point that is lower than any required by one or more product streams so that any mixing of treated water with untreated water can produce service water that satisfies the particular requirements of each product stream.

Those of ordinary skill should recognize that the treatment system can be adjustable to accommodate fluctuations in demand as well as variations in water quality requirements. For example, the systems and methods described herein may produce low LSI water that is available to the treatment system as a whole, during extended idle periods. The low LSI water, in some embodiments, may be used to flush the wetted components of the treatment system, which may reduce the likelihood of scaling and increase the service life not only the individual components, but also the treatment system as a whole. In accordance with some embodiments, the systems and methods described herein provide for producing treated liquids, such as water, having a low conductivity. The treatment system may comprise a fluid circuit that provides treated or, in some cases, softened water or, in other cases, low conductivity water, and/or low LSI water, to one or more product streams and subsequently, one or more points of use.

In another embodiment of the systems and methods described herein, treatment system 30 may comprise one or more flow regulators for regulating liquid flow. For example, a flow regulator may regulate the volume of fluid discharged from the system via a waste stream. According to another embodiment of the systems and methods described herein, the flow regulator may be a valve that may be intermittently opened and closed according to a predetermined schedule for a predetermined period of time to allow a predetermined volume of water to flow. The volume of flowing fluid may be adjusted by, for example, changing the frequency and/or duration that the flow regulator is opened and closed. In some embodiments, the flow regulator may be controlled or regulated by a controller, through, for example, an actuation signal. The controller may provide an actuation signal, such as a radio, current or a pneumatic signal, to an actuator, with a motor or diaphragm that opens and closes the flow regulator. The fluid regulated by a valve or flow regulator may be any fluid located in the water treatment system.

EXAMPLE

The function and advantages of these and other embodiments will be more fully understood from the following example. The example is intended to be illustrative in nature and is not to be considered as limiting the scope of the embodiments discussed herein.

Example 1—Comparison Study

An electrochemical treatment system in accordance with one or more embodiments of the systems and methods described herein and shown schematically in FIG. 2 was evaluated for performance against a control treatment system. A comparison study was conducted to evaluate the performance characteristics for both systems in cleaning a 28 gallon volume of feed water from 20 gpg to 4 gpg. The feed streams for both systems were identical in composition. Water was treated by an electrochemical device under the conditions outlined in Table 1 below.

TABLE 1

Electrochemical Treatment System Conditions; High Efficiency Electrodeionization (HEED)

| | |
|---|---|
| Module: | 15 cell pairs; 0.065" cell thickness filled with open weave supporting screens Compartment size: 7" × 7" cross section |
| Flow Rate of all streams | 1.5 gpm |
| Applied Voltage | 2 Volts/cell pair |
| No cycle switching/No requirement for additional source of acidic water | |

In addition, water was treated by a control device (a CEDI device) under the conditions outlined in Table 2 below.

TABLE 2

Control Treatment System Conditions (CEDI device)

| | |
|---|---|
| Module: | 30 cell pairs; 0.065" cell thickness with mixed bed ion exchange resin Compartment size: 7" × 7" cross section |
| Flow Rate of all streams | 2.0 gpm |
| Applied Voltage | 2 Volts/cell pair |
| Requires cycle switching/Requires additional source of acidic water to lower pH of concentrate stream | |

The results of the comparison study are shown in Table 3 and indicate that the 15 cell pair electrochemical test device was able to reduce hardness as quickly as a 30 cell pair CEDI module under conditions of equivalent flow rate and volts/cell pair.

TABLE 3

Comparison Study Results

| Water Property | Feed | CEDI (control) | Electrochemical test device |
|---|---|---|---|
| Total Hardness | 325 ppm/20 gpg | 70 ppm/4 gpg | 70 ppm/4 gpg |
| Calcium | 210 ppm | 41 ppm | 41 ppm |
| Conductivity | 1050 µS/cm | 180 µS/cm | 300 µS/cm |
| Alkalinity | 220 ppm | Dilution: 40 ppm | Dilution: 100 ppm |
| pH | 7.3 | Dilution: 6.9 | Dilution: 7.8 |
| | | Concentrate: 7.4 | Concentrate: 7.1 |
| LSI | 0 | Concentrate: 1.2 | Concentrate: 0.2 |

The electrochemical test device yields a product with a conductivity of 300 µS/cm, and indicates that the conductivity does not need to be reduced as far as required in the control CEDI device to achieve the same reduction in hardness. The cleaning rate is thus significantly improved and a comparison between the processing times required by both systems is illustrated graphically in FIG. 4. As shown, the electrochemical test device requires at least 25% less time to reduce the hardness of the feed stream than the CEDI control device. The reduced process time may allow other advantages, including a reduction in the size of the module, a reduction in the module duty cycle, and an increase in the production rate. Furthermore, the electrochemical test device does not use or require cycle switching, as did the CEDI control device. A direct comparison between properties of the feed and the product water produced by the electrochemical test device is shown below in Table 4.

TABLE 4

Water Properties of Feed and Product Streams

| Water Property | 20 gpg Feed | | 4 gpg Product | |
|---|---|---|---|---|
| | gpg | mg/L as CaCO$_3$ | gpg | mg/L as CaCO$_3$ |
| TH (gpg as CaCO$_3$) | 19.3 | 337 | 4 | 70 |
| MgH (gpg as CaCO$_3$) | 8.1 | 139 | 1.7 | 29 |
| CaH (gpg as CaCO$_3$) | 11.6 | 219 | 2.4 | 41 |
| HCO/Alkalinity (mg/L as CaCO$_3$) | | 220 | | 5.8 | 100 |
| Sulfate | | 73 | | |
| Chloride | | 106 | | |
| Na+ | | 213 | | |
| TDS (ppm) | | 550 | | |
| pH | | 7.3 | | 7.8 |
| Conductivity (µS/cm) | | 1023 µS/cm | | 300 µS/cm |

The results from an LSI analysis of the electrochemical test device are shown below in Table 5. The LSI for the concentrate stream of the test device is significantly lower than that for the CEDI control device. This is shown in the table below, with the test device consistently producing LSI values at about 0.2 or less.

TABLE 5

LSI Analysis of Electrochemical Test Device

| | Product | | | Concentrate | | | | | |
|---|---|---|---|---|---|---|---|---|---|
| Time(s) | Conductivity | Hardness | pH | Conductivity | pH | Ca | HCO$_3$ | Temp. (C.) | LSI |
| 0 | 1050 | 19 | 7.25 | 1050 | | | | 18.0 | 0 |
| 700 | 879 | 15 | 7.30 | 2888 | 6.91 | 620 | 480 | 19 | 0.11 |
| 1400 | 680 | 12 | 7.39 | 2456 | 6.96 | 530 | 440 | 19.4 | 0.12 |
| 2100 | 521 | 9 | 7.59 | 2190 | 7.05 | 475 | 440 | 20 | 0.2 |
| 2800 | 392 | 6 | 7.86 | 2058 | 7.11 | 450 | 400 | 20.2 | 0.2 |
| 3500 | 300 | 4 | 7.9 | | | | | | |

The ionic conductivity probe used for the study was a Myron L Company™ Ultrameter II. The pH was measured by a pH meter available from Oakton™. The alkalinity, calcium content, and total hardness were all measured using titration instruments available from Hach™ including model types AL-AP, EDTA, and HA 71A respectively.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the systems and methods disclosed herein. Accordingly, the foregoing description and drawings are by way of example only.

What is claimed is:

1. A water treatment system for a residential or commercial application comprising:
an electrochemical water treatment device comprising a series of alternating cation and anion exchange membranes positioned between a cathode and an anode;
a concentrate stream in fluid communication with at least one cation exchange membrane and at least one anion exchange membrane of the series of alternating cation and anion exchange membranes, the concentrate stream having an LSI that is less than about 1.0; and
a dilution stream in fluid communication with at least one cation exchange membrane and at least one anion exchange membrane of the series of alternating cation and anion exchange membranes,
wherein the cation and anion exchange membranes are configured to provide a ratio of a pH of the concentrate stream and a pH of the dilution stream to be less than about 1.0, and the water treatment system is configured to operate such that it does not require a reverse polarity cycle.

2. The water treatment system of claim 1, wherein the ratio of the pH of the concentrate stream and the pH of the dilution stream is about 0.9.

3. The water treatment system of claim 1, wherein the pH of the concentrate stream is less than or about 7.0.

4. The water treatment system of claim 1, wherein the LSI of the concentrate stream is less than or about 0.5.

5. The water treatment system of claim 1, wherein a conductivity, an alkalinity, and a pH of the dilution stream are about 300 µS/cm, about 100 ppm, and greater than about 7.0, respectively.

6. The water treatment system of claim 5, wherein an LSI of the concentrate stream is about 0.2.

7. The water treatment system of claim 1, wherein the system does not require a separate source of acidic water for the concentrate stream.

8. The water treatment system of claim 1, wherein the at least one ion exchange membrane is configured to require at least about 25% less time to reduce a hardness of a feed stream to a predetermined level than an electrochemical device that does not comprise the at least one ion exchange membrane.

9. A method of treating water for a residential or commercial application comprising:
    feeding water from a point of entry to an electrochemical water treatment device comprising a series of alternating cation and anion exchange membranes positioned between a cathode and an anode; and
    passing the feed water through a concentrating compartment in fluid communication with a cation and an anion exchange membrane of the electrochemical water treatment device to produce a concentrate stream having an LSI that is less than about 1.0;
    passing the feed water through a diluting compartment in fluid communication with a cation and an anion exchange membrane of the electrochemical water treatment device to produce a product stream and a ratio of a pH of the concentrate stream to a pH of the product stream is less than about 1.0, and the method does not require a reverse polarity cycle.

10. The method of claim 9, wherein the ratio of the pH of the concentrate stream to the pH of the product stream is about 0.9.

11. The method of claim 9, further comprises recirculating the concentrate stream and the pH of the recirculating concentrate stream is less than or about 7.0.

12. The method of claim 11, wherein the LSI of the concentrate stream is less than or about 0.5.

13. The method of claim 9, further comprising storing at least a portion of the product stream and measuring a conductivity, an alkalinity, and a pH of the stored portion of the product stream.

14. The method of claim 13, wherein the conductivity, the alkalinity, and the pH of the stored portion of the product stream are about 300 µS/cm, about 100 ppm, and greater than about 7.0, respectively.

15. The method of claim 14, further comprising calculating an LSI of the concentrate stream and the LSI of the concentrate stream is about 0.2.

16. The method of claim 9, wherein the method does not require the addition of a separate source of acidic water to the concentrate stream.

* * * * *